United States Patent [19]

Yamanoi

[11] Patent Number: 4,929,117
[45] Date of Patent: May 29, 1990

[54] MECHANISM FOR DETACHEABLY FITTING A MALE FIXING MEMBER AND A FEMALE ENGAGING MEMBER

[75] Inventor: Seijichi Yamanoi, Ina, Japan

[73] Assignee: Yamanoi Seiki Co., Ltd., Ibaraki, Japan

[21] Appl. No.: 344,349

[22] Filed: Apr. 28, 1989

[30] Foreign Application Priority Data

Dec. 26, 1988 [JP] Japan ................. 62-168515

[51] Int. Cl.⁵ .............................................. F16B 21/00
[52] U.S. Cl. ................... 403/328; 403/407.1
[58] Field of Search ............... 403/407.1, 405.1, 406.1, 403/245, 328, 122, 231, 327, 124, 325, 321, 326

[56] References Cited

U.S. PATENT DOCUMENTS

| | | | |
|---|---|---|---|
| 4,370,773 | 2/1983 | Hadary | 403/328 X |
| 4,504,167 | 3/1985 | Nakanishi | 403/328 X |
| 4,520,546 | 6/1985 | Darnell | 403/122 X |
| 4,527,925 | 7/1985 | Bauer et al. | 403/328 X |
| 4,553,873 | 11/1985 | Salice | 403/407.1 X |

FOREIGN PATENT DOCUMENTS 28-5809  6/1929  Japan .
53-91731  7/1978  Japan .
55-56067  12/1980  Japan .

Primary Examiner—Randolph A. Reese
Assistant Examiner—Peter M. Cuomo
Attorney, Agent, or Firm—Armstrong, Nikaido, Marmelstein, Kubovcik & Murray

[57] ABSTRACT

A mechanism for detacheably fitting a fixing member and an engaging member comprising a male fixing member having a head above a recessed neck of a smaller diameter and an engaging member comprising a hollow casing having an engaging body slidably fitted to the inside thereof by way of a resilient member. The fixing member and the engaging member are locked in a not-fit state by engaging the engaging body resiliently urged by the resilient member to the casing against the resiliency. The engagement between the engaging body and the fixing member in a not-fit state is released by bringing the engaging member and the head of the fixing member into press-contact, thereby engaging the elongate aperture of the smaller diameter in the engaging body and the neck of the fixing member, and locking them in a fit state by the resiliency of the resilient member. The frame main body and the resilient member are preferably molded integrally in the engaging body.

6 Claims, 2 Drawing Sheets

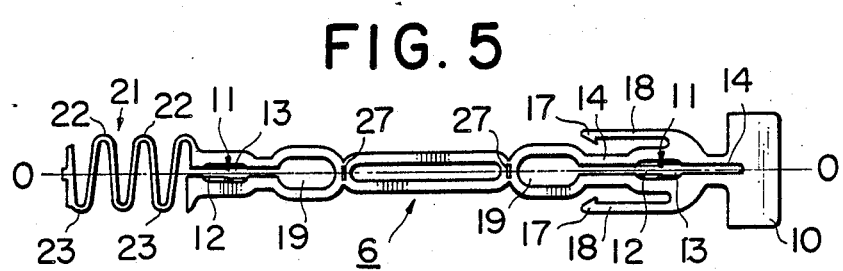
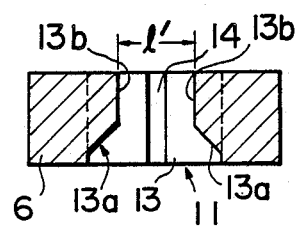
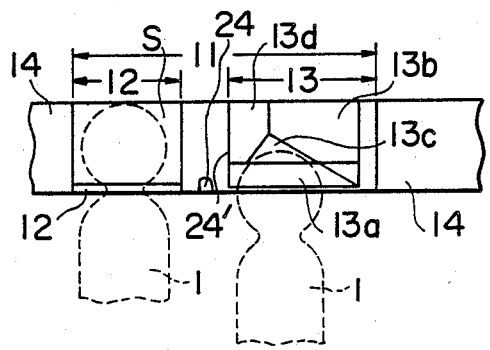
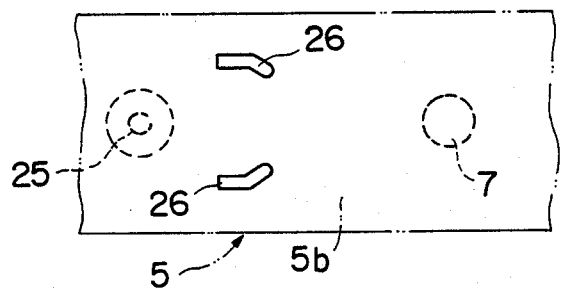
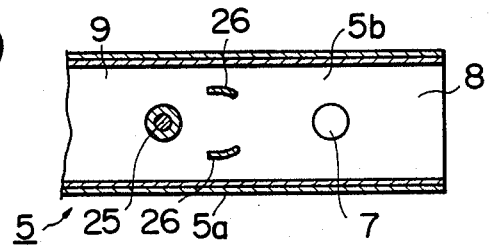

4,929,117

MECHANISM FOR DETACHEABLY FITTING A MALE FIXING MEMBER AND A FEMALE ENGAGING MEMBER

BACKGROUND OF THE INVENTION

1. Field of the Invention

The present invention concerns a mechanism for detachably fitting a male fixing member and a female engaging member and, particularly, it relates to an engaging mechanism suitable for the engagement of metal fittings of binders, etc.

2. Description of the Prior Art

As engaging mechanisms for detachably fitting a head of a rod-like male fixing member and a female engaging member, for example, in metal fittings of a paper binder, there has generally been known such a mechanism comprising a combination of a male fixing member having a head of a larger diameter and a neck of a smaller diameter contiguous therewith which are formed near the top end of the member and a plate-shaped female engaging member having a hole in which an aperture of larger diameter for receiving the head of the fixing member and a narrow elongate aperture contiguous therewith for engaging the neck of the fixing member. Metal fittings of the paperbinder having such a mechanism are disclosed, for example, in Japanese Utility Model Publication No. Sho 28-5809, Japanese Utility Model Laid-Open Publication No. Sho 53-91731 and Japanese Utility Model Publication No. Sho 55-56067.

In the engaging mechanism of this type, the head of the fixing member is at first inserted from the larger diameter portion of the hole in the engaging member, and then the neck of the fixing member is engaged to the narrow elongate aperture of the hole in the engaging member by relatively displacing the position between the fixing member and the engaging member, thereby fitting both of the members to each other not separably. The fitting between both of the members can be released by the operations in reverse of the above.

In this structure, however, if an external force is accidentally exerted on the fixing member or the engaging member, both of the members often detach undesirably, thereby bringing about a problem in the reliability.

SUMMARY OF THE INVENTION

Accordingly, it is a principal object of the present invention to provide a mechanism for detachably fitting a fixing member and an engaging member capable of automatically locking the fitting between the fixing member and the engaging member and capable of releasing such a locked state by a simple manual operation.

The foregoing object of the present invention can be attained by a combination of:

a fixing member constituted as a male member having a neck and a head as usual and an engaging member comprising a casing and an engaging body slidably inserted by way of a resilient member to the inside of the casing, the engaging body having an aperture of a larger diameter for inserting the head of the fixing member and an elongate aperture of a smaller diameter for engaging the neck, in which the fixing member and the engaging member are locked in a not-fit state by engaging the engaging body resiliently urged by the resilient member to the casing against the resiliency, and then the engagement between the engaging body and the fixing member in a not-fit state is released by bringing the engaging member and the head of the fixing member into press-contact, thereby engaging the elongate aperture of the smaller diameter in the engaging body and the neck of the fixing member, and locking them in a fit state by the resiliency of the resilient member.

Another object of the present invention is to provide the engaging mechanism described above in which the engaging body and the resilient member are formed integrally.

Another object of the present invention can be attained by integrally forming a resilient member, which is to be engaged to the casing, to a frame main body, particularly, at the top end portion thereof of the main body, or by integrally forming a rubber or like other resilient member to the top end of the frame main body of the engaging body.

DESCRIPTION OF THE ACCOMPANYING DRAWINGS

These and other objects, as well as advantageous features of the present invention, will become more apparent by reading the following descriptions of the preferred embodiments in conjunction with the appended drawings, wherein FIG. 1 is an enlarged view for a portion of a fixing member;

FIG. 5 is a plan view of an engaging body integrally formed with a resilient member;

FIG. 6 is an enlarged cross sectional view taken along line II—II in FIG. 3;

FIG. 7 is an enlarged side elevational view for explaining the inside of an engaging aperture;

FIG. 8 is a detailed explanatory view for the engagement; and

FIG. 9 is a transversal cross sectional view for a portion of a casing.

DESCRIPTION OF THE PREFERRED EMBODIMENTS

The engaging mechanism according to the present invention comprises a rod-like male fixing member 1 and a female engaging member 4 detachably fit to the top end of the fixing member 1.

Figure 1:
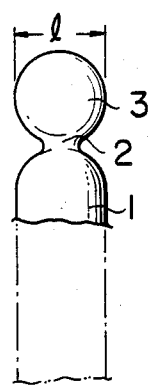

As shown in FIG. 1, the fixing member 1 has a recessed neck 2 formed near the top end and a head 3 generally of a spherical shape integrally formed in contiguous with and above the neck 2. The base end of the fixing member 1 is secured, for example, to one of the substrates of a paper binder or file although not illustrated.

The engaging member 4 comprises a casing 5 and a engaging body 6 slidably disposed within the casing 5.

Figure 2:
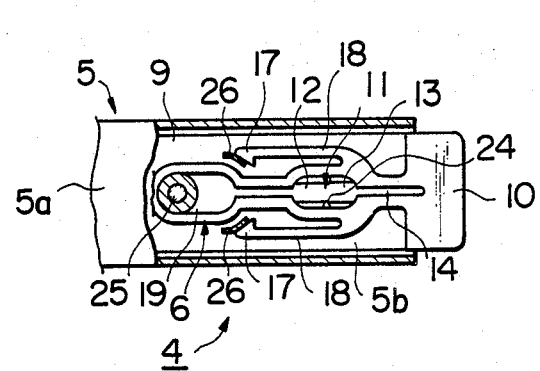
FIG. 2 is a plan view for a portion of an engaging member, partially cut-away, for illustrating the inside thereof.

As shown in FIGS. 2 and 9, the casing 5 has a cover plate 5a and a base plate 5b which define a sufficient space therebetween to dispose the engaging body 6 for reciprocal sliding in the longitudinal direction. One of the plates has, perforated therein, an insertion aperture 7 for inserting the head 3 of the fixing member 1. An operation opening 8 is formed at one end of the casing 5 for inserting and retracting one protruding end of the engaging body 6.

An engaging protrusion (protrusions in the illustrated embodiment) 26 is formed integrally to the inner wall of either one of the cover plate 5a and the bottom plate 5b of the casing 5 for engagement with the hook 16 of the engaging arm 18 of the engaging body 6 described later. The engaging protrusion 26 is desirably bent inwardly on the side to which the hook 16 is forwarded. Further, the casing 5 has a telescopic pin 25 for combining the cover plate 5a and the base plate 5b, which is engaged with a long guide aperture 19 in the engaging body 6 described later to be used as a guide when the engaging body 6 reciprocates.

Figure 3:
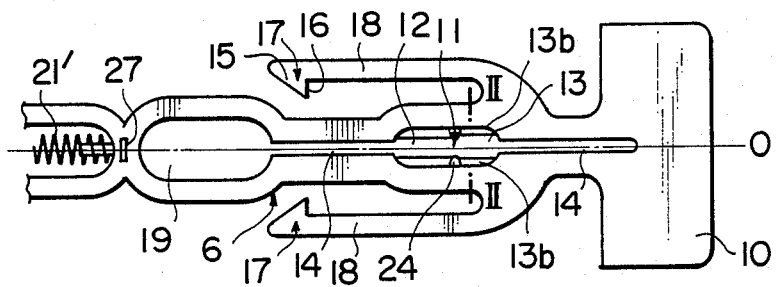
FIG. 3 is an enlarged plan view for a portion of the engaging body.

As shown in FIGS. 2, 3 and 5, the engaging body 6 comprises a flame made of a plastic or like other material having a resiliency and a predetermined rigidity, which has a operating portion 10 formed at one end thereof that intrudes into and retracts from the operation opening 8 of the casing 5 and an engaging hole 11 formed at a plate portion contiguously ahead of the operating portion 10 that corresponds to the insertion aperture 7 of the casing 5.

The engaging hole 11 has an insertion portion 13 preferably of a circular shape for receiving the head 3 of the fixing member 1 which is inserted through the insertion aperture 7 of the casing 5 and a sliding portion 12 for engaging the neck 2 of the fixing member 1 for integral engagement of the fixing member 1 and the engaging body 6. The sliding portion 12 and the insertion portion 13 are adjacent with each other in the longitudinal direction of the engaging body 6 and constitute a continuous hole as a whole.

The insertion portion 13 for receiving the head 3 of the fixing member 1 has a receiving opening of a size equal to or larger than the maximum diameter or width of the head 3 and bulged portions 13b, 13b formed on both side walls in contiguous with the opening by way of tapered portions 13a, 13a. The distance 1' between the tapered portions 13a and 13a is smaller than the size 1 of the head 3 of the fixing member 1. Accordingly, when the tapered portions 13a, 13a are abutted against the head 3 of the fixing member 1 at a predetermined pressure, the portion of the frame at the periphery of the engaging hole 11 expands laterally by the resiliency of the frame of the engaging body 6.

It is desirable that a slit 14 is formed in the longitudinal direction of the engaging hole 11, if necessary, so that the lateral expansion and restoration is facilitated depending on the resiliency and the rigidity of the engaging body 6. Although, the slit 14 is formed on both sides of the engaging hole 11 in the drawing, it may be formed only on one side.

As shown in FIG. 7, the sliding portion 12 of the engaging aperture 11 is formed to the lower portion of the engaging body 6, over which a space S for receiving the head 3 of the fixing member 1 is formed.

A partitioning protrusion 24 is formed between the sliding portion 12 and the insertion portion 13 of the engaging hole 11 for engaging the head 3 of the fixing member 1 with a moderate feeling of resistance. The wall surfaces 13c, 13d extended from the midway of the bulged portion 13b in the insertion portion 13 to the boundary 24' of the partitioning protrusion 24 constitute slopes diverged toward the space S above the sliding portion 12 so that the head 3 of the fixing member 1 can be guided to the space S above the sliding portion 12.

As shown in FIGS. 2, 3 nad 5, the engaging body 6 has paired engaging arms 18 integrally formed to the frame near the engaging hole 11 and extended outwardly therefrom. In the illustrated embodiment, the engaging arm 18 is extended outwardly from the vicinity of the insertion portion 13 of the engaging aperture 11 and then turned and extended in parallel with the axial line 0—0 of the main body frame of the engaging body 6 so that the engaging arm 18 gives resiliency. The engaging arm 18 has, formed at the top end thereof, an engaging portion 17 comprising a finger 15 and a hook 16 formed at the base of the finger 15.

The engaging arm 18 may be disposed only on one side of the engaging body 6 or, alternatively, on both sides of the engaging body 6 in right-to-left symmetry as illustrated in the drawings.

The engaging hole 11, the engaging arm 18, the insertion aperture 7 and the engaging protrusion 26 of the engaging member 4 are constituted in such a positional relationship that the insertion portion 13 of the engaging hole 11 and the insertion aperture 7 of the casing 5 aligned with each other when the engaging body 6 is pushed into the casing 5 and the hook 16 of the engaging arm 18 is engaged to the engaging protrusion 26, whereas the sliding portion 12 of the engaging hole 11 and the insertion aperture 7 of the casing 5 are aligned with each other when the engagement between the hook 17 and the engaging protrusion 26 is released and the engaging body 6 is returned to the home position.

As shown in FIG. 5, the engaging body 6 has a spring or like other resilient member 21 for resiliently supporting the engaging body 6 in the casing 5.

FIG. 3 shows one embodiment in which a resilient member 21' is disposed in contiguous with the front portion of the engaging body 6 but, more preferably, a resilient member 21 is integrally disposed as a part of the frame of the engaging body 6 as shown in FIG. 5. The resilient member 21 in the embodiment shown in FIG. 5 is integrally made from a part of the frame of the engaging body 6 into a zig-zag form of the resilient member 21 having bent portions 23, 23 for resiliently supporting the engaging body 6 by the resiliency of the bent portions 22, 23. Particularly, if the engaging body 6 is molded from a synthetic resin, etc., the frame main body of the engaging body 6 and the resilient member 21 can be molded as one piece. However, the present invention is not restricted only to the embodiment shown in the drawing. For instance, the frame of the engaging body 6 may be partially or entirely formed with rubber or like other flexible material for providing the resiliency to the engaging body 6 by the recoiling force of the flexible portion.

In FIGS. 2, 3 and 5, a long guide hole 19 is formed to the frame of the engaging body 6, so that the telescopic pin 25 for combining the cover plate 5a and the base plate 5b of the casing 5 is engaged with the long guide hole 19 and the reciprocal movement of the engaging body 6 is controlled by the engagement between the long guide hole 19 and the pin 25.

Figure 4:
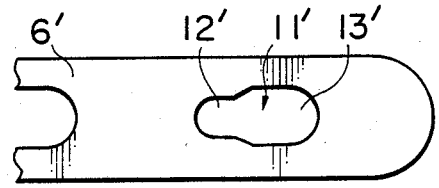
FIG. 4 is an enlarged plan view for a portion of an auxiliary engaging body.

If necessary, an auxiliary engaging body 6' for reinforcement as shown in FIG. 4 may be overlaid integrally to the engaging body 6 on the side to which the fixing member 1 is inserted, at the rear side of the engaging body 6, that is, on the side of inserting the fixing member 1. The auxiliary engaging body 6' is made of a thin plate such as of metal and has an opening 11' corresponding to the engaging hole 11 of the engaging body 6. The opening 11 has such a shape that communicates an insertion portion 13' corresponding to the insertion portion 13 of the engaging hole 11 with a sliding portion 12' corresponding to the sliding portion 12 of the engaging hole 11. The auxiliary engaging body 6', for example, has a finger (not illustrated) protruded from the surface of the plate, which is inserted into an insertion slit 27 of the engaging body 6 for integrally engaging the engaging body 6 and the auxillary engaging body 6'.

In the case where the auxiliary engaging body 6' is laid over the engaging body 6, since the sliding portion 12' of the auxiliary engaging body 6' has substantially the same function as that of the sliding portion 12 of the engaging body 6, the sliding portion 12 of the engaging body 6 may be substituted therewith.

The fitting mechanism of the present invention is applicable not only to the fitting between the pair of the fixing member 1 and the insertion hole 7 but also to such an embodiment as shown in FIG. 5, in which a plurality of engaging holes 11 are disposed each at a predetermined distance in a continuous engaging body 6, to which a plurality of corresponding fixing members 1 are detacheably fit.

The engaging member 4 is assembled by inserting the engaging body 6 of the foregoing constitution (or the assembly of the engaging body 6 and the auxiliary engaging body 6') into the casing 5 and engaging the inside of the long guide hole 19 of the engaging body 6 with the guide pin 25 of the casing 5.

The operation of the fitting mechanism according to the present invention is to be explained briefly.

In a state shown in FIG. 2, the engaging arm 18 on the engaging body 6 of the engaging member 4 is out of engagement with the engaging protrusion 26 and, accordingly, the resilient member 21 of the engaging body 6 is freely extended. In this state, the insertion aperture 7 in the casing 5 is aligned with the sliding portion 12 of the engaging hole 11 in the engaging body 6.

When the operating portion 10 of the engaging body 6 is pressed into the casing 5 in this state against the resilient member 21, the engaging arm 18 moves along the axial direction in the casing 5 and the hook 16 of the engaging arm 18 is caught by the engaging protrusion 26 of the casing 5. In this case, the insertion aperture 7 in the casing 5 is aligned with the insertion portion 13 of the engaging hole 11 in the engaging body 6 and the engaging body 6 is locked at this position while being resiliently urged by the resilient member 21. The engaging member 4 is abutted against the head 3 of the fixing member 1, while aligning the insertion aperture 7 and the insertion portion 13 of the engaging hole 11 in communication with each other.

Since the head 3 of the fixing member 1 is abutted against the tapered surface 13a of the insertion portion 13 in the engaging hole 11, when the upper surface of the engaging member 4 is pressed, the engaging hole 11 is extended laterally by the intrusion of the head 3. Then, the engaging arm 18 is also extended, accompanyingly, by which the engagement between the hook 16 of the engaging body 6 and the engaging protrusion 26 of the casing 5 is released and, at the same time, the engaging body 6 is returned to the position shown in FIG. 2 by the resiliency of the resilient member 21. As a result, the sliding portion 12 of the engaging hole 11 engages the neck 2 of the fixing member 1 to fit the fixing member 1 and the engaging member 4 to each other.

Upon detaching the engaging member 4 from the fixing member 1, the operating portion 10 of the engaging body 6 is pushed to snap-fit the engaging arm 18 to the engaging protrusion 26. Since the head 3 of the fixing member 1 situates below the tapered surface 13a of the insertion portion 13 in the engaging hole 11 in this state, the engaging body 6 can easily be detached from the fixing member 1.

Since the fitting mechanism of the present invention has the foregoing constitution, it can be applied to filing metals for paper sheets such as a binder, as well as, generally, to those devices for detachably fitting those members with each other which require such engagement and disengagement.

What is claimed is

1. A mechanism for detachably fitting a male fixing member and a female engaging member, comprising:
    a male fixing member having a recessed neck and a head formed adjacent therewith at a top end of said fixing member;
    a female engaging member which is detachably fit to said fixing member,
    said engaging member having a hollow casing and an engaging body slidably inserted inside said casing so as to reciprocate along a longitudinal centerline of said engaging member,
    said casing having a top plate and a base plate having an operation opening formed at one end thereof for inserting said engaging body, at least one of said top plate and said base plate having an insertion aperture for inserting the head of said fixing member and an engaging protrusion for engaging said engaging body to a predetermined position, and
    said engaging body having a frame main body with a top end portion extended in the longitudinal direction and having, perforated therein, an engaging hole including an insertion portion for receiving the head of said fixing member and a sliding portion for engaging the neck of said fixing member that are continuous to each other in a longitudinal direction, at least one engaging arm integrally formed to the frame main body adjacent said engaging hole and resiliently extended outwardly therefrom, and a resilient member for resiliently urging the engaging body to the operation opening 8 of said casing,
    said insertion portion of the engaging hole having a bulged portion formed with tapered surfaces, for abutment against the top end of the head of said fixing member, so that the engaging hole and the engaging arm are expanded and deformed laterally when the head of said fixing member and said tapered surfaces, are brought into press-contact, and
    said insertion portion of the engaging hole being aligned with the insertion aperture of said casing when the engaging arm of said engaging body resiliently urged by the resilient member is snap-fit with the engaging protrusion of said casing.

2. A mechanism for detachably fitting the male fixing member and the female engaging member as defined in claim 1, wherein a slit is formed contiguous with at least one end of the engaging hole and extended along the longitudinal centerline of the engaging body.

3. A mechanism for detachably fitting the male fixing member and the female engaging member as defined in claim 1 or 2, wherein the resilient member is formed integrally with the frame main body of the engaging body.

4. A mechanism for detachably fitting the male fixing member and the female engaging member as defined in claim 3, wherein the resilient member comprises a spring member integrally formed in a zig-zag form in the top end portion of the frame main body of the engaging body.

5. A mechanism for detachably fitting the male fixing member and the female engaging member as defined in one of claims 1 or 2, wherein a plurality of engaging holes are formed at a predetermined distance in the axial direction of the engaging body, and a plurality of insertion apertures for receiving the head of the fixing member are formed in the casing corresponding to said plurality of engaging holes and a plurality of the fixing member are provided corresponding to said plurality of engaging holes of said engaging member.

6. A mechanism for detachably fitting the male fixing member and the female engaging member as defined in one of claims 1 or 2 wherein a plate-shaped auxiliary engaging body having an engaging hole, which is formed corresponding to the engaging hole of the engaging body and has an insertion portion for receiving the head of the fixing member and a sliding portion for engaging the neck of the fixing member perforated continuously in a longitudinal direction, is engaged to the engaging body such that the auxiliary engaging body is located between the engaging body and the fixing member.

* * * * *